July 14, 1925.  
R. BOEHM  
MOTOR VEHICLE  
Filed June 27, 1921 4 Sheets-Sheet 1

1,546,165

Inventor  
Reinhold Boehm,  
By Henry Orth  
atty.

July 14, 1925. 1,546,165
R. BOEHM
MOTOR VEHICLE
Filed June 27, 1921 4 Sheets-Sheet 2
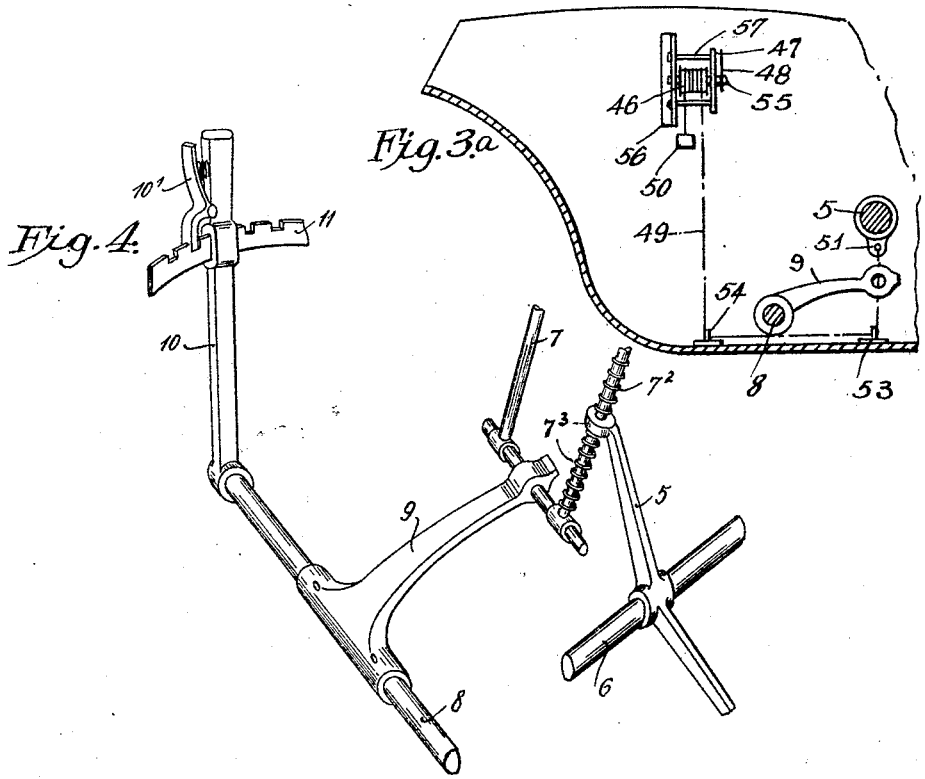
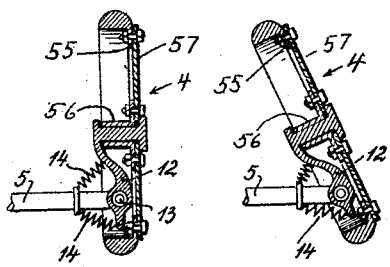
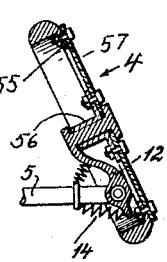
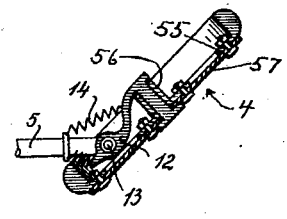
Inventor
Reinhold Boehm
By [signature]
Atty.

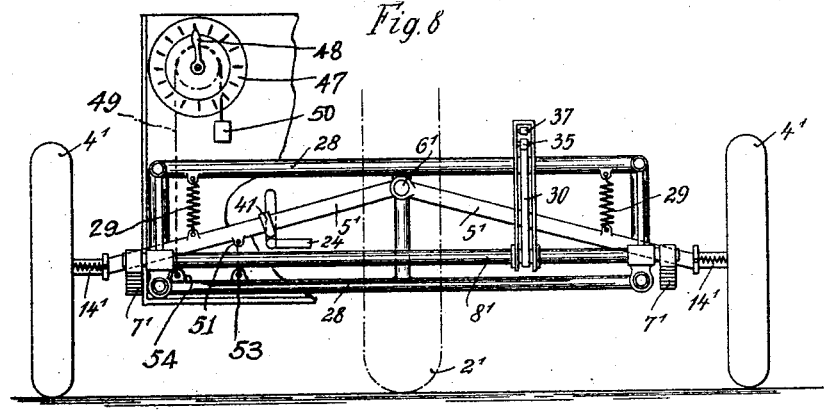
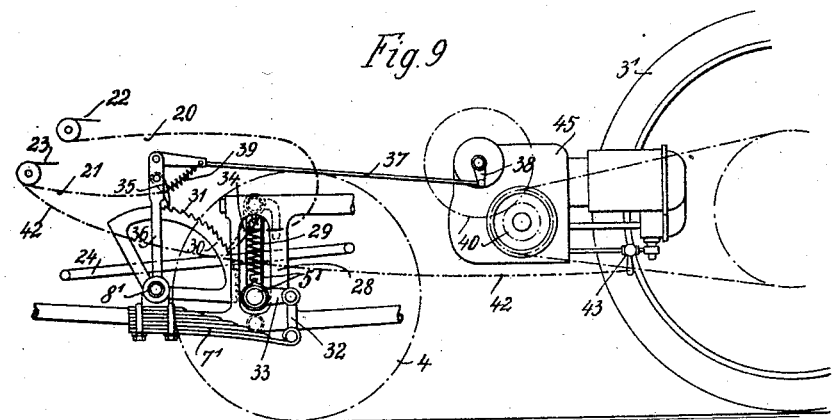

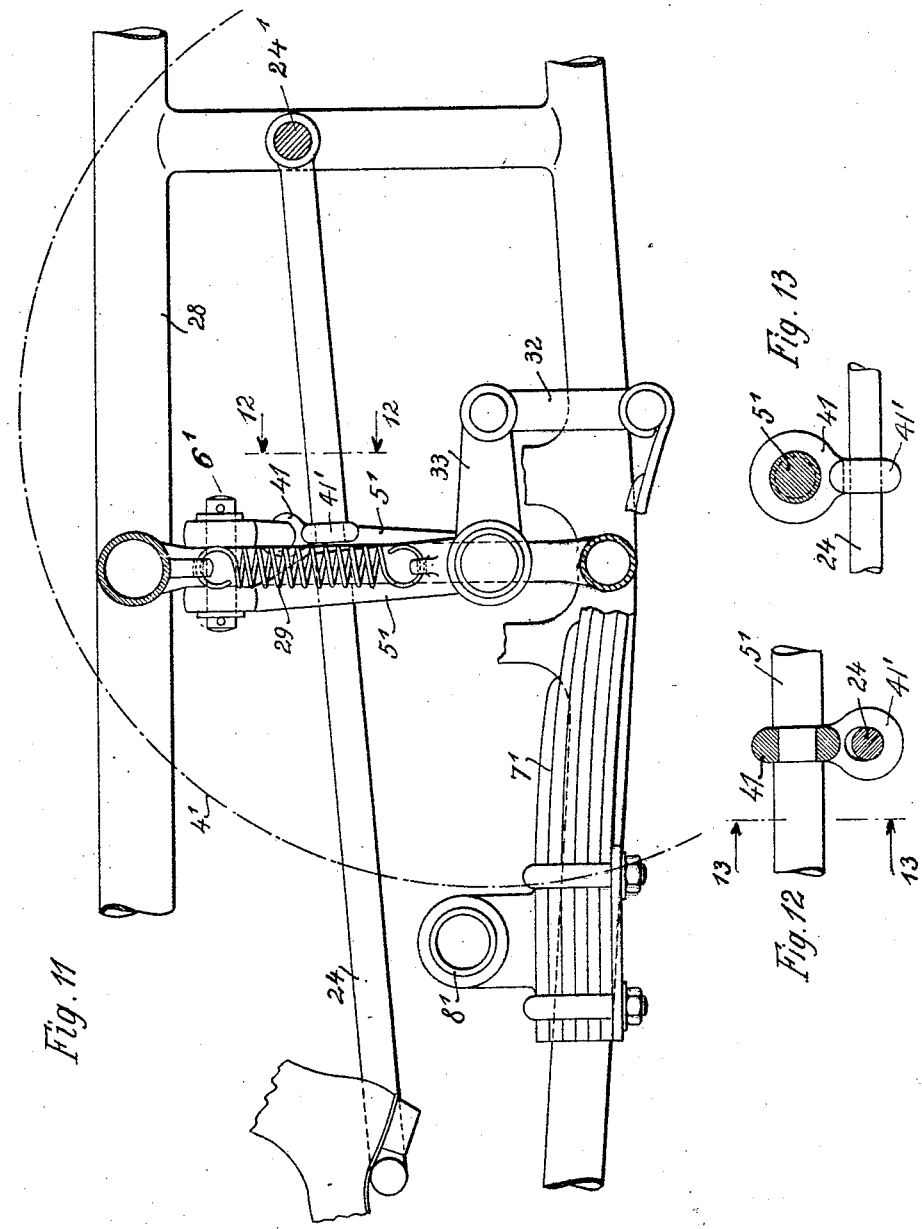

Patented July 14, 1925.

1,546,165

UNITED STATES PATENT OFFICE.

REINHOLD BOEHM, OF BERLIN-JOHANNISTHAL, GERMANY, ASSIGNOR TO ALFRED MORGAN, OF BERLIN, GERMANY.

MOTOR VEHICLE.

Application filed June 27, 1921. Serial No. 480,834.

*To all whom it may concern:*

Be it known that I, REINHOLD BOEHM, a citizen of the German Republic, residing at Berlin-Johannisthal, Germany, have invented certain new and useful Improvements in Motor Vehicles; and I do hereby declare the following to be a full, clear, and exact description of the invention, such as will enable others skilled in the art to which it appertains to make and use the same.

My invention relates to improvements in motor vehicles, and more particularly in motor vehicles in which the body of the vehicle is supported on a front and rear wheel disposed in tandem fashion and in which in addition side supporting wheels are provided one at each side of the vehicle, which side supporting wheels are normally out of contact with the ground and bear thereon when the vehicle is inclined sidewise and more particularly when it is running in a curve. As is known in the art such side support wheels are adapted to be set relatively to the vehicle in different positions vertically, so that the inclination of the vehicle can be regulated according to varying conditions of the drive. One of the objects of the improvements is to mount the side supporting wheels in such a way that in any position to which they may have been set they are vertical or substantially vertical when setting on the ground. Another object of the improvements is to mount the side supporting wheels in such a way that when set in elevated positions and setting on the ground their distance from the main wheels is increased as compared to that of the side supporting wheels set in lower positions, so that the vehicle finds a broad support when it is inclined sidewise. Another object of the improvements is to provide mechanical means for setting the side supporting wheels, and finally an object of the improvements is to provide means located in front of the engineer for indicating the position of the side supporting wheels. With these and other objects in view my invention consists in the matters to be described hereinafter and particularly pointed out in the appended claims.

In order that the invention be more clearly understood two examples embodying the same have been shown in the accompanying drawings, in which the same reference characters have been used in all the views to indicate corresponding parts. In said drawings,—

Fig. 3$^a$ is a section on the line 3$^a$—3$^a$ of Fig. 2.

Figure 1:
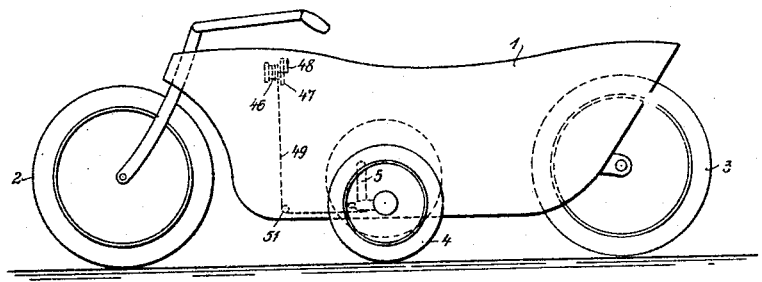
Fig. 1, is a diagrammatical side view of the vehicle.

Fig. 4, is a perspective view of the mechanism for setting the wheels vertically, Figs. 5 to 7, are horizontal cross-sections of one of the trailing side supporting wheels showing the same in different angular positions, Fig. 8, is a vertical cross-section through the frame of a vehicle showing a modification of the invention, Fig. 9, is a partial side view of the frame of the vehicle shown in Fig. 8, and Fig. 10, is a diagrammatical view showing the mechanism for indicating the position of the side supporting wheels.

Fig. 10$^a$ is a side view, partly in section, of Fig. 10.

Fig. 11 is an elevation on an enlarged scale of a part of the vehicle illustrated in Figs. 8 and 9, and looking from the side of the vehicle, the front part of the frame and other parts being removed.

Fig. 12 is a detail sectional view taken on the line 12—12 of Fig. 11 and showing the connection of the treadle and one of the rockers carrying the side supporting wheels, and Fig. 13 is a cross-section taken on the line 13—13 of Fig. 12 and looking in the direction of the arrows.

Referring now to the example illustrated in Figs. 1 to 7, my improved vehicle comprises a body 1 mounted on front and rear wheels 2 and 3 arranged in tandem fashion, and side supporting wheels 4 located one on each side of the vehicle. As shown the side supporting wheels are mounted on rockers 5 mounted for rocking upwards and downwards in a plane disposed transversely of the vehicle, the fulcrums 6 of the rockers being disposed parallel or substantially parallel to the longitudinal axis of the vehicle. In the example shown in Figs. 1 to 7 the pivots are disposed in the side walls of the vehicle. The inner ends of the rockers are connected with an arm 9 provided on a transverse rock shaft 8. To the rock shaft a setting lever 10 is keyed which is adapted to be operated by hand and to be fixed in set position by means of a pawl 10¹ engaging in a notched segment 11. As shown the rockers 5 are elastically connected with the arm 9, said arm carrying rods 7 having springs 7² and 7³ coiled thereon and engaging the rockers from opposite sides.

As appears more particularly from Figs. 5 to 7, the rim 55 of each side supporting wheel 4 is connected with the hub 56 thereof by a disk 57 and each of the side supporting wheels is mounted on an arm 12 rockingly mounted on a horizontal pivot bolt 13 provided on the outer ends of the rocker 5 and disposed within the space circumscribed by the wheel 4, and to the arm 12 springs 14 are attached which tend to set the wheel 4 with its plane in the direction of the travel of the vehicle but yield when the vehicle is running in a curve. Figs. 6 and 7 show the wheel in different positions.

In my improved vehicle means are provided whereby at any time the position of the rockers 5 is indicated, so that it is not necessary for the engineer to direct his eyes away from the road and rearwards in order to ascertain the position of the wheels 5. Such means will be described hereafter in connection with the modification shown in Figs. 8 and 9.

Figure 2:
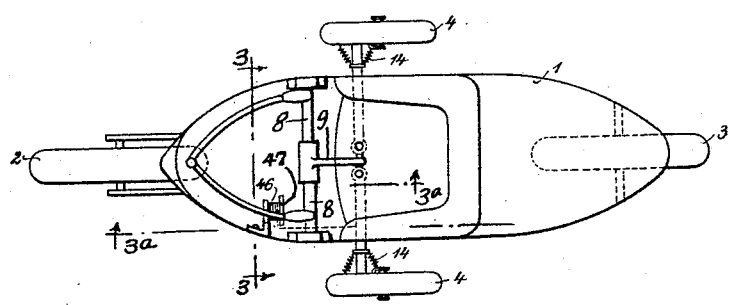
Fig. 2, is a plan view of Fig. 1.
Figure 3:
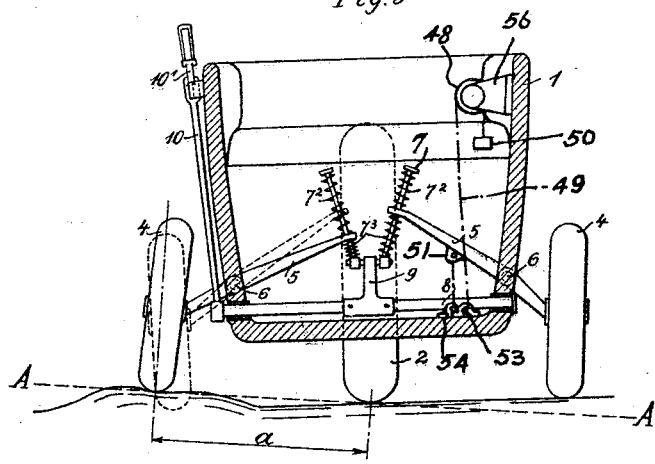
Fig. 3, is a vertical cross-section of the vehicle on the line 3—3 of Fig. 2.

The operation of the vehicle is as follows. In Figs. 1 to 3 I have shown the side supporting wheels in their lowermost positions, the vehicle actually running on four wheels. As shown in Fig. 3, the road at the right of the vehicle is level, while at the left of the vehicle the wheel runs over an elevated part of the road, so that the rocker 5 located at the left is rocked upwards, while the right hand rocker does not change its position. Such independent rocking movement is made possible by the springs 7², 7³.

Ordinarily the wheels 4 are set in elevated positions by rocking the rock shaft 8, so that the vehicle runs on its main wheels 2 and 3. If now the vehicle is inclined sidewise, for example when running in a curve, one of the wheels 4 sets on the ground, so that the vehicle runs on three wheels. Thereby side slip is prevented. It may be assumed that the side supporting wheel has been set by rocking the shaft 8 into the position shown at the left in Fig. 3 in full lines, and that one of the wheels bears on the ground. To show the position of the wheel relatively to the ground, the road has been indicated by a broken line A—A. As appears from the figure the wheel 4 is nearly perpendicular to the ground. Therefore practically no lateral pressure is exerted on the wheel which is particularly important because the wheel is mounted for trailing about the pivot bolt 13. The figure also shows, that the distance a of the side supporting wheel from the main wheels 2 and 3 is considerably increased which provides a broad support of the vehicle and a high stability thereof. It will be understood that these features are particularly important when the vehicle is running in a curve.

Figs. 5 to 7 show the function of the springs 14 tending to hold the wheel 4 in median position but yielding to lateral pressure on the wheels when the vehicle is running in a curve. The figures also show, that when the wheel is rocked sidewise its lateral displacement towards and away from the vehicle is comparatively small. This is important because thereby the wheels can be disposed near the body of the vehicle.

In Figs. 8 and 9 I have shown a modification in which the side supporting wheels are set by power operated means. The general arrangement of the vehicle and the construction of the side supporting wheels correspond to Figs. 1 and 2 and 5 to 7, and for clearness sake corresponding parts have received the same reference characters which however have been primed.

As shown in Figs. 8 and 9 the side supporting wheels 4¹ and their rockers 5¹ are mounted on a transverse frame 28 of the body of the vehicle, and the rockers have a common fulcrum 6¹ located at the middle of the frame and in the direction of the longitudinal axis of the vehicle. Springs 29 have the tendency to pull the rockers upwards with the wheels 4¹ away from the ground. The mechanical means for rocking the rockers downwards is provided by the motor 45 connected with the rear or driving wheel 3¹ and mechanism now to be described. In front of the frame 28 a transverse rock shaft 8¹ is mounted on the body of the vehicle, which shaft is connected with the rockers 5¹ by means of strong leaf springs 7¹ rigidly secured thereto, links 32, and arms 33 secured to the rockers. To the shaft 8¹ a sector 30 is keyed which is formed with ratchet teeth 31 normally engaged by a pawl 34. At opposite sides of the sector a pair of levers 36 are loosely mounted on the shaft 8¹, and the said levers are continuously rocked to and fro by means of a connecting rod 37 jointed to the upper ends thereof. The arms carry a pawl 35 adapted to be thrown into engagement with the ratchet teeth 31 by suitable means such as a Bowden cable 21 and a hand operated lever 23 preferably mounted on one of the steering arms of the front wheel 2¹ of the vehicle. Normally the pawl 35 is retracted from the sector 30 by means of a spring 39. The rod 37 is adapted to be reciprocated by means of a crank 38 connected with the crank shaft of the motor 45 by means of gear wheels 40. The pawl 34 is adapted to be retracted from the ratchet teeth of the sector 30 by suitable means. To show what may be done a Bowden cable 20 is provided which is connected with a hand operated lever 22 mounted on one of the steering arms of the front wheel $2^1$.

In the modification shown in Fig. 10 the side supporting wheels 4, 4, are rotatably mounted on the outer ends of rockers $5^2$, $5^2$. These rockers project through vertical slots $1^a$ provided in the sides of the body 1, and have their inner ends pivoted at 6, 6, on a block 61 centrally mounted on the bottom of the body. The transverse shaft 8 is journaled in bearings $8^a$, $8^a$, beneath the bottom of the body and has two laterally projecting arms 9, 9, fixed thereon. The outer ends of the arms 9 are articulated to the lower ends of sliding rods 7, which project upward through said bottom. These rods 7 are flexibly connected to the rockers $5^2$, $5^2$ through the instrumentality of coiled springs $7^2$, $7^3$, which surround the rods 7, and lugs $5^3$ (Fig. $10^a$) fixed on the rockers, and through which lugs the rods extend. The lugs project between and form abutments for the inner ends of the springs, the upper ends of the springs $7^2$ abutting against heads on the free ends of the rods 7 and the lower end of spring $7^3$ abutting against the bottom of the body 1. It will be seen that if either of the wheels 4 passes over a stone or the like the upper springs $7^2$ will be compressed and the lower springs $7^3$ expanded, thus exerting an increased elastic pressure in a downward direction.

The shaft 8 may be rocked by means of a hand lever 10 which is adapted to be fixed in position by means of a pawl 10' engaging in a notched segment, as clearly shown in Figs. 4 and $10^a$.

One of the rockers $5^1$ is connected by a link 41 with a treadle 24 by means of which both rockers can be rocked downwards or arrested in an intermediate position. As shown in Figs. 11 to 13, the treadle 24 has its fulcrum on a transverse rod 24' of the frame of the vehicle, and it is jointed to the rocker 5' by a link 41 secured to the rocker and formed with an eye 41' loosely engaging the treadle 24. The free end of the treadle is bent laterally to provide a foot rest for operation of the treadle by engineer's foot.

The operation of the mechanism shown in Figs. 8 and 9 is as follows:

Normally the side supporting wheels are locked in set position by the pawl 34 acting in opposition to the springs 29 and to the pressure of the road on the wheels. If the wheels $4^1$ are in their lowermost positions, and the engineer desires to elevate the same, the pawl 34 is manually retracted by the driver from the sector 30, 31 by means of the lever 22 and the Bowden cable 20, whereupon both wheels are presently thrown into their uppermost positions by the springs 29. If it is desired to arrest the wheels in intermediate positions the treadle 24 is held accordingly by the foot of the engineer, and pawl 34 is permitted to re-engage the sector 30. In order to rock the wheels downwards into their lowermost or into intermediate positions, the engineer throws the pawl 35 into engagement with the sector 30, 31 by means of the lever 23 and the Bowden cable 21. Therefore the sector 30 is rapidly rocked from the motor 45 acting through the reciprocating rod 37. As soon as the wheels have assumed the desired positions the lever 23 is released, whereupon the pawl 35 is retracted from the sector 30 by the spring 39, and the sector is locked in set position by the pawl 34.

Should the motor be out of operation the side supporting wheels can be set by the treadle 24. As appears from Fig. 9 the uppermost part of the sector 30 is not provided with ratchet teeth, in order that the wheels are not rocked downwards too far in case the engineer omits to throw the pawl 35 out of operation.

When throwing the pawl 35 into operation the load on the motor is suddenly increased. In order to avoid an undesirable reduction of the velocity of the motor I prefer to connect the pawl or its operating mechanism with the gas supply in order to increase the fuel supply when throwing the pawl 35 into operation. For convenience sake I have shown a Bowden cable 42 controlled by the hand lever 23 and acting on the gas supply 43.

It has been stated above that means are provided for indicating at any time the position of the side supporting wheels and which are so located that it is not necessary for the engineer to look out of the vehicle in order to ascertain the exact position of the wheels. It will be understood that such indicating means are important because when turning the vehicle sidewise the engineer should exactly know what curve he can take in view of the speed of the car and the position of the side supporting wheels, and he will ordinarily not be allowed to turn his eyes from the road and rearwards. I wish it to be understood that such means are provided in both examples described above. The indicator mechanism is shown in detail in Fig. $3^a$. At a suitable part of the vehicle, and preferably in front of the seat of the engineer, (Figs. 1 and 2) a dial 47 is mounted, and a hand 48 disposed in front of the dial indicates the positions of the side supporting wheels. To an eye 51 on the rock arm 5 or 5' a cord 49 is attached, and is passed through eyes 53 and 54 secured to the bottom of the body 1. The cord carries a weight 50 and is wound on a drum 46 fixed on an arbor 55 which carries the hand 48. The arbor is rotatably mounted in a bracket 56, secured to the side of the body 1, and in the dial plate 47 which is connected to the bracket 56 by stays 57.

While in describing the invention reference has been made to particular examples embodying the same I wish it to be understood that my invention is not limited to the constructions shown in the figures, and that various changes may be made in the general arrangement of the mechanisms and the construction of their parts within the gist of my invention.

I claim:

1. In a vehicle, the combination, with the body, and the front and rear wheels arranged in tandem, of rockers disposed transversely of the longitudinal axis of the vehicle and having fixed fulcrums disposed parallel to said axis, side supporting wheels mounted on said rockers, and means to set said rockers with the side supporting wheels in running position at different distances from the ground.

2. In a vehicle, the combination with the body, and the front and rear wheels arranged in tandem, of rockers disposed transversely of the longitudinal axis of the vehicle and having fixed fulcrums disposed parallel to said axis, and within the longitudinal median plane of the vehicle, side supporting wheels mounted on said rockers, and means to set said rockers with the side supporting wheels in running position at different distances from the ground.

3. In a vehicle, the combination with the body and the front and rear wheels arranged in tandem, of rockers disposed transversely of the longitudinal axis of the vehicle and having fixed fulcrums disposed substantially parallel to said axis, bearing pins on said rockers arranged parallel to said axis, side supporting wheels trailingly mounted on said pins, and means to set said rockers with the supporting wheels in running position at different distances from the ground.

4. In a vehicle, the combination, with the body, and front and rear wheels arranged in tandem fashion, of side supporting wheels, and power operated means to set said side supporting wheels vertically.

5. In a vehicle, the combination with the body, and front and rear wheels arranged in tandem, of side supporting wheels, spring controlling the position of the springs relative to the body, and power operated means cooperating with the springs to set the side supporting wheels vertically.

6. In a vehicle, the combination, with the body, and front and rear wheels arranged in tandem fashion, of side supporting wheels, springs tending to lift said side supporting wheels from the ground, and mechanical means adapted to lower the side supporting wheels and inoperative when the side supporting wheels are in their lowermost positions.

7. In a vehicle, the combination with the body, and front and rear wheels arranged in tandem fashion, of side supporting wheels, power operated means to set said side supporting wheels vertically, and springs interposed between said power operated means and side supporting wheels.

8. In a vehicle, the combination with the body, front and rear wheels arranged in tandem fashion, and a motor for driving said vehicle, of side supporting wheels, mechanism for setting said side supporting wheels vertically, means to connect said mechanism with the motor, and means operative together with said connecting means for regulating the supply of motive fluid to said motor.

9. In a vehicle, the combination with the body, front and rear wheels arranged in tandem fashion, and a motor for driving said vehicle, of side supporting wheels, mechanism for setting said side supporting wheels vertically, and means to connect said mechanism with the motor.

10. In a vehicle, the combination with the body, and the front and rear wheels arranged in tandem fashion, of rockers disposed transversely of the vehicle and having fixed fulcrums disposed substantially in the direction of the longitudinal axis of the vehicle, side supporting wheels mounted on said rockers, and power operated means to set said rockers with the supporting wheels in positions ready for running and different distances away from the ground.

11. In a vehicle, the combination with the body, and the front and rear wheels arranged in tandem, of rockers disposed transversely of the vehicle and having fixed fulcrums disposed substantially parallel to the longitudinal axis of the vehicle, bearings on the rockers parallel to said axis, side supporting wheels mounted on said bearings, springs connecting the wheels and rockers, means cooperating with the springs to set said rockers with the supporting wheels in running position at different distances from the ground.

12. In a vehicle, the combination with the body, and the front and rear wheels arranged in tandem, of rockers disposed transversely of the vehicle and having fixed fulcrums disposed substantially parallel to the longitudinal axis of the vehicle, bearings on the rockers parallel to said axis, side supporting wheels mounted on said bearings, spring connecting the wheels and rockers, and mechanically operated pawl and ratchet mechanism to set said rockers with the supporting wheels in running position at different distances from the ground.

13. In a vehicle, the combination with the body, and the front and rear wheels arranged in tandem fashion, of rockers disposed transversely of the vehicle and having fixed fulcrums disposed substantially in the direction of the longitudinal axis of the vehicle, side supporting wheels mounted on said rockers, and power operated means and means for operation by human power to set said rockers with the supporting wheels in positions ready for running and different distances away from the ground.

14. In a vehicle, the combination with the body, and front and rear wheels arranged in tandem, of side supporting wheels, means to set said side supporting wheels vertically, and means actuated by the wheel setting means to indicate the position of said side supporting means.

15. In a vehicle, the combination with the body, and front and rear wheels arranged in tandem, of side supporting wheels, means to set said side supporting wheels vertically, and means actuated by the wheel setting means located in front of the engineer's seat to indicate the position of said side supporting means.

In testimony whereof I hereunto affix my signature in the presence of two witnesses.

REINHOLD BOEHM.

Witnesses:
FRANZ REINHOLD,
GERTRUD SCHWARZ.